United States Patent
Bhogal et al.

(10) Patent No.: US 8,990,192 B2
(45) Date of Patent: Mar. 24, 2015

(54) SEARCH ENGINE OPTIMIZATION USING A FIND OPERATION

(71) Applicant: International Business Machines Corporation, Armonk, NY (US)

(72) Inventors: Kulvir S. Bhogal, Fort Worth, TX (US); Lisa Seacat DeLuca, San Francisco, CA (US); Jenny S. Li, Danbury, CT (US); Robert R. Peterson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 46 days.

(21) Appl. No.: 13/715,815

(22) Filed: Dec. 14, 2012

(65) Prior Publication Data

US 2014/0172841 A1   Jun. 19, 2014

(51) Int. Cl.
*G06F 7/00* (2006.01)
*G06F 17/30* (2006.01)

(52) U.S. Cl.
CPC ...... *G06F 17/30442* (2013.01); *G06F 17/3053* (2013.01)
USPC ............ 707/723; 707/724; 707/729; 707/730

(58) Field of Classification Search
CPC ................... G06F 17/30699; G06F 17/30696; G06F 17/30705
USPC ......... 707/722, 723, 724, 729, 730, 711, 741, 707/742, 743
See application file for complete search history.

(56) References Cited

U.S. PATENT DOCUMENTS

| | | |
|---|---|---|
| 5,623,588 A | 4/1997 | Gould |
| 6,226,645 B1 * | 5/2001 | Bae et al. .................. 707/999.1 |
| 6,339,437 B1 | 1/2002 | Nielsen |
| 6,369,819 B1 | 4/2002 | Pitkow et al. |
| 6,590,594 B2 | 7/2003 | Bates et al. |
| 6,885,363 B2 | 4/2005 | Smith |
| 6,956,591 B2 | 10/2005 | Lundin et al. |
| 6,963,874 B2 | 11/2005 | Kasriel et al. |
| 7,693,869 B2 | 4/2010 | Hutson et al. |
| 7,725,422 B2 | 5/2010 | Ryan et al. |
| 7,836,408 B1 | 11/2010 | Ollmann et al. |
| 8,229,911 B2 | 7/2012 | Bennett |
| 2006/0075357 A1 | 4/2006 | Guido et al. |
| 2006/0155728 A1 | 7/2006 | Bosarge |
| 2007/0038608 A1 | 2/2007 | Chen |
| 2008/0046218 A1 | 2/2008 | Dontcheva et al. |

(Continued)

OTHER PUBLICATIONS

Crestani et al., "Is This Document Relevant? . . . Probably: A Survey of Probabilistic Model in Information Retrieval", ACM, 1998, pp. 528-552. Download: http://dl.acm.org/citation.cfm?id=299920.*

(Continued)

*Primary Examiner* — Hares Jami
(74) *Attorney, Agent, or Firm* — Janaki K. Davda; Konrad, Raynes, Davda and Victor LLP

(57) ABSTRACT

Provided are a computer implemented method, computer program product, and system for ranking search results. It is determined that a find operation with a find keyword has been issued for a page. In response to determining that the find keyword has been located on the page, the find keyword is stored in an index as relevant text for the page. In response to receiving a subsequent search request for which the page is retrieved, the page is ranked based on the find keyword.

17 Claims, 9 Drawing Sheets

(56) References Cited

U.S. PATENT DOCUMENTS

| | | | |
|---|---|---|---|
| 2008/0243613 | A1 | 10/2008 | Silvestri et al. |
| 2009/0138445 | A1 | 5/2009 | White et al. |
| 2010/0036828 | A1 | 2/2010 | Carmel et al. |
| 2010/0125781 | A1 | 5/2010 | Gadacz |
| 2010/0131870 | A1 | 5/2010 | Park |
| 2010/0145954 | A1* | 6/2010 | Barlin et al. .................. 707/754 |
| 2011/0047028 | A1 | 2/2011 | Kim et al. |
| 2011/0125555 | A1 | 5/2011 | Fradkin |
| 2011/0161260 | A1 | 6/2011 | Burges et al. |
| 2011/0202522 | A1 | 8/2011 | Ciemiewicz et al. |
| 2011/0225134 | A1 | 9/2011 | Monga et al. |
| 2011/0307462 | A1 | 12/2011 | Holsman et al. |
| 2011/0314042 | A1* | 12/2011 | Nuggehalli et al. .......... 707/769 |
| 2012/0023104 | A1 | 1/2012 | Johnson et al. |
| 2012/0036119 | A1 | 2/2012 | Zwicky et al. |

OTHER PUBLICATIONS

U.S. Appl. No. 14/225,880, filed Mar. 26, 2014, entitled "Search Engine Optimization Using a Find Operation", invented by Kulvir S. Bhogal et al., pp. 1-33.

Preliminary Remarks, dated Mar. 26, 2014, for U.S. Appl. No. 14/225,880, filed Mar. 26, 2014, entitled "Search Engine Optimization Using a Find Operation", invented by Kulvir S. Bhogal et al., pp. 1-2.

Brajnik, G., "Ranking Websites through Prioritized Web Accessibility Barriers", University of Udine, Italy, Sep. 29, 2006, pp. 1-8.

Mell, P., T. Grance, and L. Badger, "Effectively and Securely Using the Cloud Computing Paradigm", NIST, Information Technology Laboratory, Oct. 7, 2009, Total 80 pp.

Mell, P. and T. Grance, "The NIST Definition of Cloud Computing (Draft)", Recommendations of the National Institute of Standards and Technology, Jan. 2011, Total 7 pp.

Richardson, M., A. Prakash, and E. Brill, "Beyond PageRank: Machine Learning for Static Ranking", IW3C2 ACM, Edinburgh, Scotland, May 23-26, 2006, pp. 1-9.

U.S. Appl. No. 13/715,865, filed Dec. 14, 2012, entitled "Search Engine Optimization Utilizing Scrolling Fixation", invented by Bhogal, K.S., L.S. Deluca, and R.R. Peterson, Total 30 pp.

Office Action, dated Jun. 5, 2014, for U.S. Appl. No. 14/225,880, filed Mar. 26, 2014, invented by Kulvir S. Bhogal et al., Total 16 pages.

Response to Office Action, dated Sep. 5, 2014, for U.S. Appl. No. 14/225,880, filed Mar. 26, 2014, invented by Kulvir S. Bhogal et al., Total 6 pages.

Preliminary Amendment, dated Mar. 25, 2014, for U.S. Appl. No. 13/715,865, filed Dec. 14, 2012, invented by K.S. Bhogal et al., Total 6 pp.

U.S. Appl. No. 14/224,914, filed Mar. 25, 2014, invented by K.S. Bhogal et al., Total 27 pp.

Preliminary Remarks, dated Mar. 25, 2014, for U.S. Appl. No. 14/224,914, filed Mar. 25, 2014, invented by K.S. Bhogal et al., Total 2 pp.

Notice of Allowance, dated Nov. 24, 2014, for U.S. Appl. No. 14/225,880, filed Mar. 26, 2014, invented by Kulvir S. Bhogal et al., Total 13 pages.

\* cited by examiner

SEARCH ENGINE OPTIMIZATION USING A FIND OPERATION

FIELD

Embodiments of the invention relate to search engine optimization using a find operation (e.g., a find operation issued to a browser).

BACKGROUND

Online search engines are tools for connecting end-users with desired web pages. A user enters a search request made up of one or more search keywords, and a search engine returns a list of web pages that were located based on the one or more search keywords.

SUMMARY

Provided are a computer implemented method, computer program product, and system for ranking search results. It is determined that a find operation with a find keyword has been issued for a page. In response to determining that the find keyword has been located on the page, the find keyword is stored in an index as relevant text for the page. In response to receiving a subsequent search request for which the page is retrieved, the page is ranked based on the find keyword.

BRIEF DESCRIPTION OF THE SEVERAL VIEWS OF THE DRAWINGS

In the drawings, like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies located in the marketplace, or to enable others of ordinary skill in the art to understand the embodiments disclosed herein.

Figure 1:
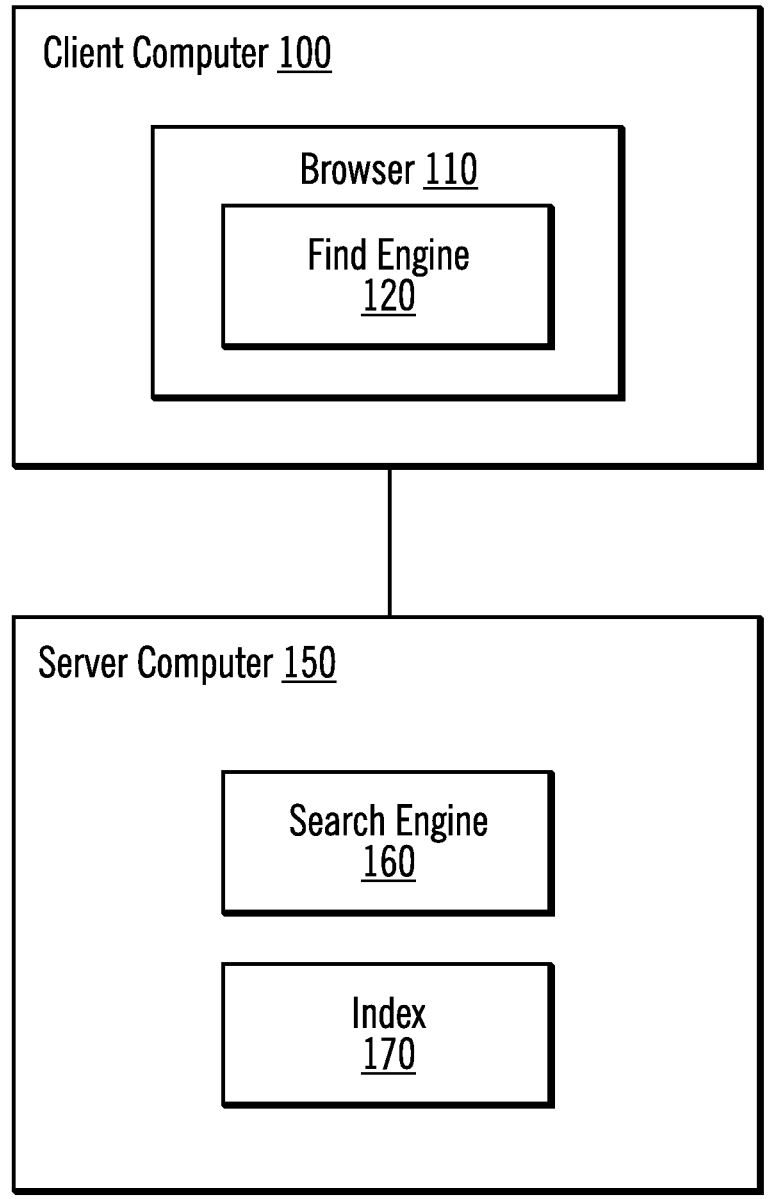
FIG. 1 illustrates, in a block diagram, a computing environment in accordance with certain embodiments.

FIG. 1 illustrates, in a block diagram, a computing environment in accordance with certain embodiments. A client computer 100 is coupled to a server computer 150. The client computer 100 includes a browser 110 that may be used to issue search requests. In certain embodiments, the browser 110 includes a find engine 120. In such embodiments, the find engine 120 may be a plug-in to the browser 110. In other embodiments, the find engine 120 may be separate from the browser 110. The server computer 150 includes a search engine 160 and an index 170. The search engine 160 receives a search request from the browser 110, executes a search of one or more data stores (e.g., the World Wide Web (WWW) or Internet, a company's internal data stores, etc.), ranks the search results, and returns the search results to the browser 110. The browser 110 may display or otherwise provide the search results to a searcher (e.g., an end-user, an application, etc.).

The find engine 120 provides an efficient search technique to allow a searcher to locate what the searcher is looking for. The find engine 120 optimizes searches performed by the search engine 160 by taking into account what searchers are searching for using a find operation. In particular, a find operation is performed to perform searches for "find keywords" on a page. For example, when the browser 110 displays search results, the searcher may select a link (e.g., a hyperlink or a Uniform Resource Locator (URL)) in the search results to obtain a page (e.g., a web page, document page, etc.). Then, the searcher may use the find operation to search for find keywords within the page. The find engine 120 monitors the find operations and collects the find keywords. The find engine 120 provides the find keywords to the search engine 160 for storage in the index 170. Then, the search engine 160 uses the stored find keywords to rank pages and provide improved search results for subsequent search requests.

Figure 2:
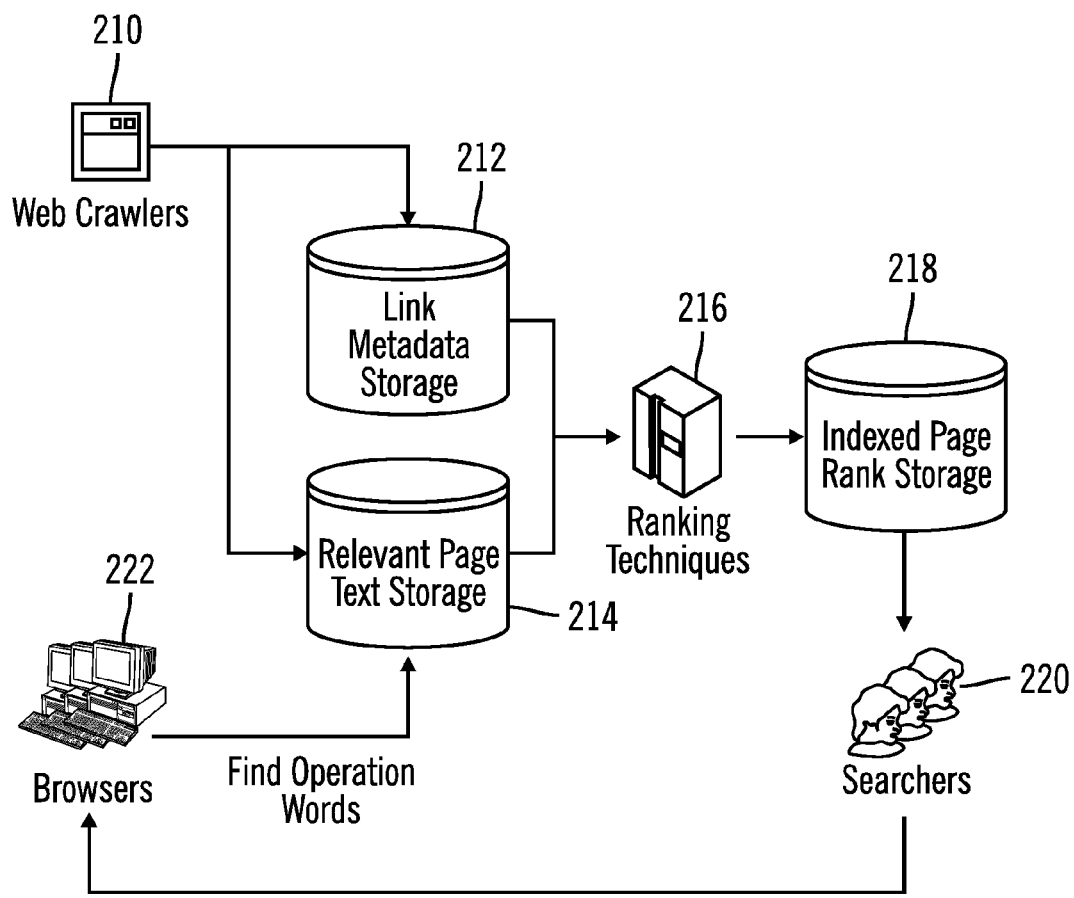
FIG. 2 illustrates, in a block diagram, a computing environment in accordance with certain alternative embodiments.

FIG. 2 illustrates, in a block diagram, a computing environment in accordance with certain alternative embodiments. In certain embodiments, web crawlers 210 collect information. The web crawlers 210 may be described as long-running computer programs that automatically browse websites to collection information about them. The web crawlers 210 may also be referred to as robots or spiders. The web crawlers 210 may run continuously and use headless browser technology with the intent to automatically browse every website on the WWW. The web crawlers 210 employed by the search engine 160 collect information including: (1) link information to other sites (e.g., hyperlinks or URLs on the page that are used to access another page), (2) back link information from other sites that reference this web page with associated texts and (3) text within the page. The collected link information may be stored in (1) link metadata storage 212 and (2) relevant page text storage 214. Each of the searchers 220 may submit search requests using the browsers 222. For example, a searcher can enter "lose weight" as keywords. Then, a list of search results is presented to the searcher 220, where each of the search results includes a link to a web page. The searcher 220 may select a web page from the search results, browse the web page in a browser 222, and perform find operations of certain keywords on the web page. For example, the searcher may use the find operation to look for find keywords "low calories diet" on the web page. The find keywords, as well as, the results of these find keywords are captured as additional relevancy information of the web page with respect to the find keywords and the original search keywords. In this example, the find keywords "low calories diet" are relevant to the original search keywords "lose weight", and the find operations return numerous hits on the find keywords "low calories", which help to increase the relevancy of the web page with respect to the keywords "lose weights" and "low calories diet". This relevancy information as a result of the find operations on the web page is captured and stored in the relevant page text storage 214 to improve future searches. In addition, if the find operation fails to find the selected keywords from the web page, the zero find result is also captured and decreases the relevancy of the web page with respect to the find keywords.

Then, a particular page is ranked using one or more ranking techniques 216 based on enhanced relevancy information stored in the relevant page text storage 214, the relevancy of description in the meta tags of the web page, words used in the URL link of the web page with respect to the search keywords that are stored in the link metadata storage 212, and other typical search engine optimization characteristics. The indexed page rank storage 218 stores information on page rankings based on the result of the ranking technique 216.

Pages are indexed by the text or keywords located on the page by web crawlers. The web crawler also makes an educated guess of what text on the page is relevant, and the search engine 160 indexes the page based on that text. For example, if text is part of a heading, a web crawler may consider the text to be relevant, and the words in the text may be used to index the page. These words may also match the keywords entered by searchers while using the search engine. As another example, the words used in the links that other pages have to that particular page may also be used as relevant text. Moreover, social media may be used to rank and index pages.

In certain embodiments, the browser 110 includes a find User Interface (UI) (e.g., a find button or a find box) that enables a find operation to search for elements on a page displayed by the browser 110. In certain alternative embodiments, the find engine 120 provides the UI to enable the find operation.

Figure 3:
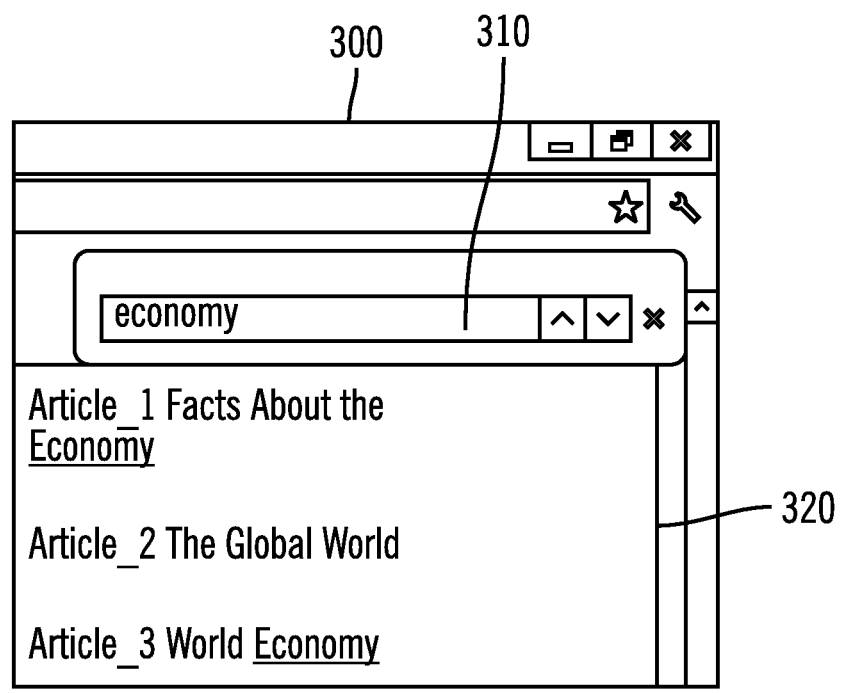
FIG. 3 illustrates, in a block diagram, an example find box in accordance with certain embodiments.

FIG. 3 illustrates, in a block diagram, an example find box 310 in accordance with certain embodiments. In FIG. 3, a browser 300 includes a find box 310 and a web page 320. Words entered into the find box may be referred to as find keywords. The find box 310 includes the word "economy". When the find operation is issued (e.g., a user types one or more find keywords into the find box 310 and select "enter"), the browser 110 searches for the word "economy" in a displayed page and, if the word "economy" is located, may highlight the word "economy" in the displayed page. Highlighting may include, for example, changing the color of the find keyword, underlining the find keyword, displaying the find keyword in bold, etc. For example, in the web page 320, the word "economy" is underlined for Article_1 and Article_3.

The find engine 120 optimizes text associated with individual pages by providing find keywords to the search engine 160 for indexing the page that was searched using the find operation. The find engine 120 monitors the find operation and obtains words used by searchers in the find box. Then, the find engine 120 sends the words entered into the find box to the search engine 160. In this manner, the find engine 120 provides an additional source for indexing text: the keywords used by a searcher in a find operation.

The find keyword searches may show how relevant a page is with respect to what the searcher is looking for and how much time the searcher spends on the page based on the words the searcher has searched on. For example, the longer the time the user spends on a page with respect to the find keywords, the more relevant the page is considered to be.

The search engine 160 uses the find keywords to index the page on which the find keywords were searched for using a find operation. For example, if 50% of searchers that visit a particular page use the find operation to look for the word "economy", then the search engine 160 may increase the importance of that word in its indexing technique. The longer time the searchers spend on the page is an indication that the page is of interest to the searchers, therefore, the page is of higher relevancy to the find keywords. When a subsequent searcher enters "economy" as a keyword in a search request, the search engine 160 may rank that particular page higher on the list of pages to be returned in response to the search request because of the use of find keywords in ranking the page.

When a searcher is on a page, and the searcher uses the find operation to find a word, and the find operation fails to find a match to the word in the page, the find engine 120 provides this information to the search engine 160, as well. For example, consider the case in which many searchers visit a page and use the find operation to look for "chocolate" and the word "chocolate" is not located on the page. Then, when a subsequent searcher issues a search request with "chocolate" as a keyword, the search engine 160 knows that the page is not as relevant as other pages and, thus, may change the pages' order in the displayed list. For example, without the find keyword information, the page may have been displayed as the second page in the list, while, with the find keyword information, the page may be displayed as the last page in the list.

Thus, even find operations that are "misses" are sent to the search engine 160. When a searcher searches for text in a browser 110 and does not find a desired find keyword, the ranking technique may rank the page lower on the list than when the find keyword is located in the page.

In certain embodiments, a find keyword filter is provided a searcher. The find keyword filter allows a searcher to indicate whether no find keywords, some find keywords or all find keywords may be submitted to the search engine 160. In this manner, a searcher may "opt-out" of having find keywords submitted to the search engine 160.

In certain embodiments, a ranking filter is provided. The ranking filter enables a page to be ranked using a subset of find keywords associated with that page (e.g., find keywords submitted by employees of a company, find keywords submitted by friends and family, people in the searchers' social networks, etc.).

Figure 4:
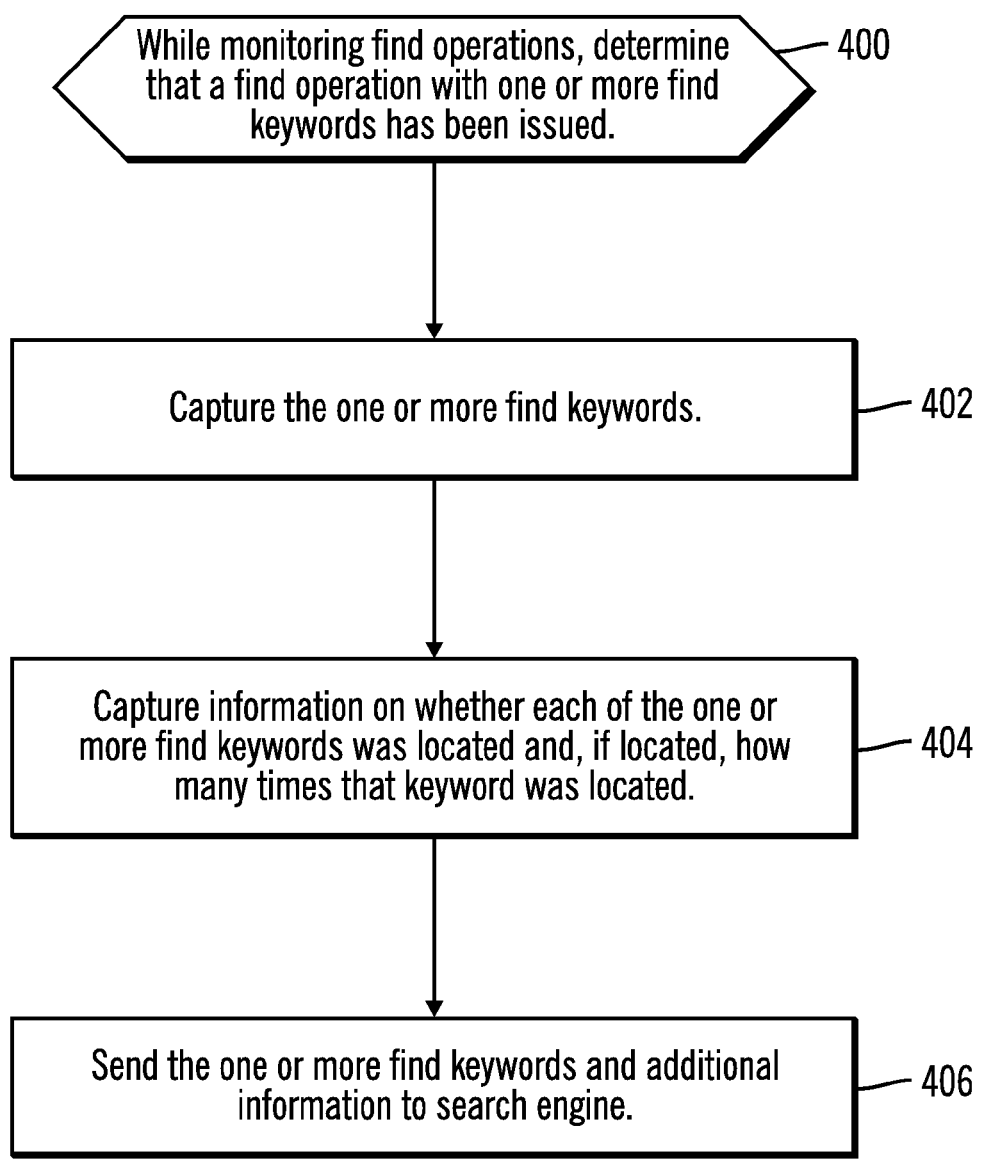
FIG. 4 illustrates, in a flow diagram, operations for monitoring and storing find keywords in accordance with certain embodiments.

FIG. 4 illustrates, in a flow diagram, operations for monitoring and storing find keywords in accordance with certain embodiments. Control begins in block 400 with the find engine 120, while monitoring find operations, determining that a find operation with one or more find keywords has been issued. In block 402, the find engine 120 captures the one or more find keywords. In block 404, the find engine 120 captures information on whether each of the one or more find keywords was located and, if located, how many times that keyword was located. In certain embodiments, the find engine 120 also captures information on how much time the search spent in searching. In block 406, the find engine 120 sends the one or more find keywords and additional information to search engine.

Figure 5:
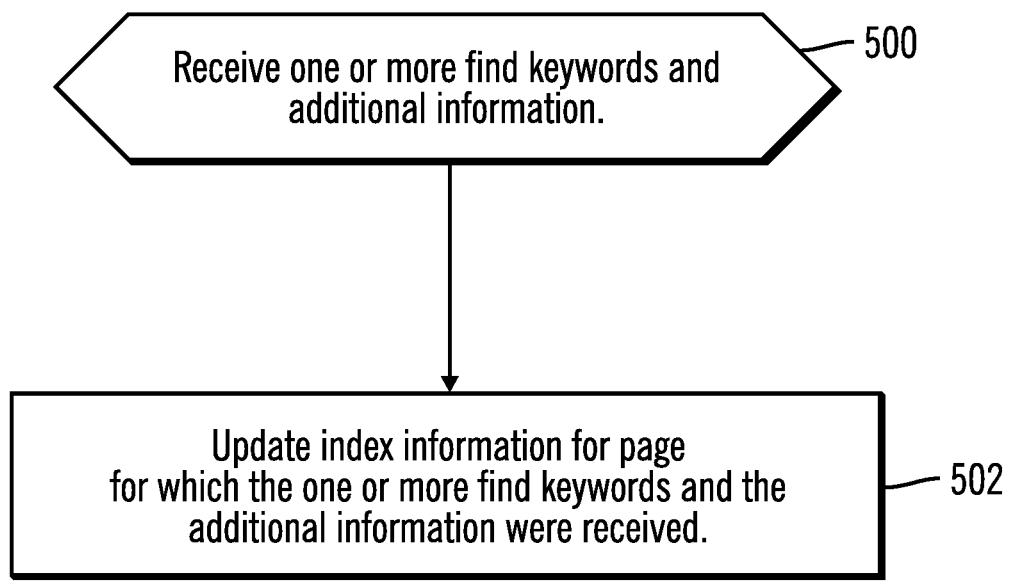
FIG. 5 illustrates, in a flow diagram, operations for storing the find keywords in an index in accordance with certain embodiments.

FIG. 5 illustrates, in a flow diagram, operations for storing the find keywords in an index in accordance with certain embodiments. Control begins at block 500 with the search engine 160 receiving one or more find keywords and additional information. In block 502, the search engine 160 updates index information for the page for which the one or more find keywords and the additional information were received. For example, a searcher may enter "lose weight fast" as search keywords for the search engine 160. The search engine 160 displays a list of web pages based on the ranking of relevancy of web pages with respect to the search keywords. The searcher browses one of the web pages from the result list. The searcher performs a find operation with find keywords "lose weight fast" on the web page from the browser. In this example, the find engine 120 highlights places where the find keywords are found on the web page. The find engine 120 captures the number of hits of the find keywords on this web page, associates the web page with the find keywords "lose weight fast", and stores the relevance information (e.g., in the relevant page text storage 214). In this example, the find keywords are the same as the original search keywords.

In another embodiment, the find keywords may be different from the original search keywords. For example, the original search keywords are "lose weight fast" and a list of web pages are presented to the searcher. The searcher may browse one of the web pages from the result list and enter "low calories" as the find keywords on the web page. The find engine 120 associates the find keywords with the number of hits that matches the find keywords. The find engine 120 also associates the find keywords ("low calories" in this example) with the original search keywords ("lose weight fast" in this example). Therefore, the web page that the searcher browsed in this example has increased its relevancy as the searcher is able to find relevant texts associated with either the search keyword or the find keywords that were entered.

In yet another embodiment, the browser 110 keeps track of the time the searcher spends on a web page, the number of find operations the searcher performs, and the find keywords the searcher entered. The longer the time the searcher spend on a web page, the stronger the indication that the web page is of higher relevancy. In addition, the browser 110 keeps track of the number of users that search the same find keywords on the same web page. The more users that browse the same web page, search for the same keywords, and get hits on the web page, the higher the relevancy of the web page with respect to the find keywords.

Figure 6:
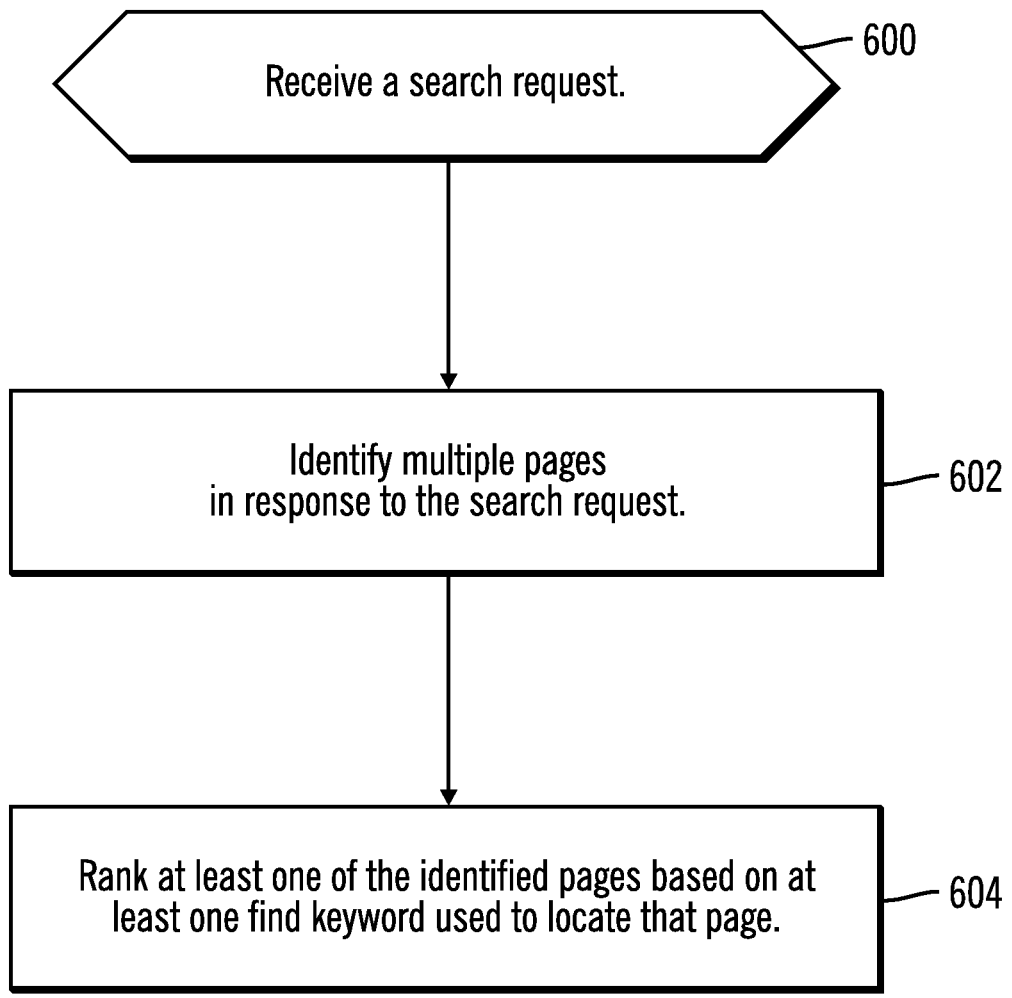
FIG. 6 illustrates, in a flow diagram, operations for using find keywords to rank search results in accordance with certain embodiments.

FIG. 6 illustrates, in a flow diagram, operations for using find keywords to rank search results in accordance with certain embodiments. Control begins at block 600 with the search engine 160 receiving a search request. In block 602, the search engine 160 identifies multiple pages in response to the search request. In block 604, the search engine 160 ranks at least one of the identified pages based on at least one find keyword used to locate that page.

Thus, embodiments incorporate data from the find operation (that may be explicitly selected by human users) to better rank pages. Find keywords sent by one or more browsers are stored as relevant text associated with a page. In certain embodiments, the find keywords from the find operations in browsers may be considered high priority.

In certain embodiments, the find engine 120 monitors one or more find keywords input for a find operation to search for the one or more find keywords in a page. In response to determining that at least one of the find keywords is located in the page, the find engine 120 stores the located find keywords in an index as relevant text for the page. In certain embodiments, the find engine 120 marks these located find keywords as high priority in the index.

In response to a new search request for which the page is retrieved, the search engine 160 ranks the page based on the find keywords in the index. In certain embodiments, the search engine 160 takes into account that the find keywords in the index are marked as high priority.

In response to determining that at least one find keyword is not located in the page, the find engine 120 stores the at least one find keyword that is not located in the index for the page. In certain embodiments, the find engine 120 marks the at least one find keyword that is not located as low priority in the index.

In certain embodiments, the page is ranked higher in a list of pages when at least one find keyword associated with the page in the index is marked as high priority. In certain embodiments, the page is ranked lower in a list of pages when least one find keyword associated with the page in the index is marked as low priority. If a page is associated with at least one find keyword marked as high priority and at least one find keyword marked as low priority, the page is ranked based on various factors. For example, the find engine 120 may compare x, the number of find operations of the keyword found in the page, to y, the number of find operations of the keyword that is not found in the page. If x>y, that means more people are able to find the keyword that they searched for. If x<y, that means most people are disappointed as they can not find the keyword that they searched for on the page. So if x>y means most people are satisfied, then the rank of the page can go up. If x<y, the rank of the page can go down. As another example, the find engine 120 may calculate a hit ratio. If 70 hits are found out of 100 find operations, then the hit ratio is 70%, and the miss ratio is 30%. The higher the hit ratio, the higher the ranking of a page.

Cloud Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 7:
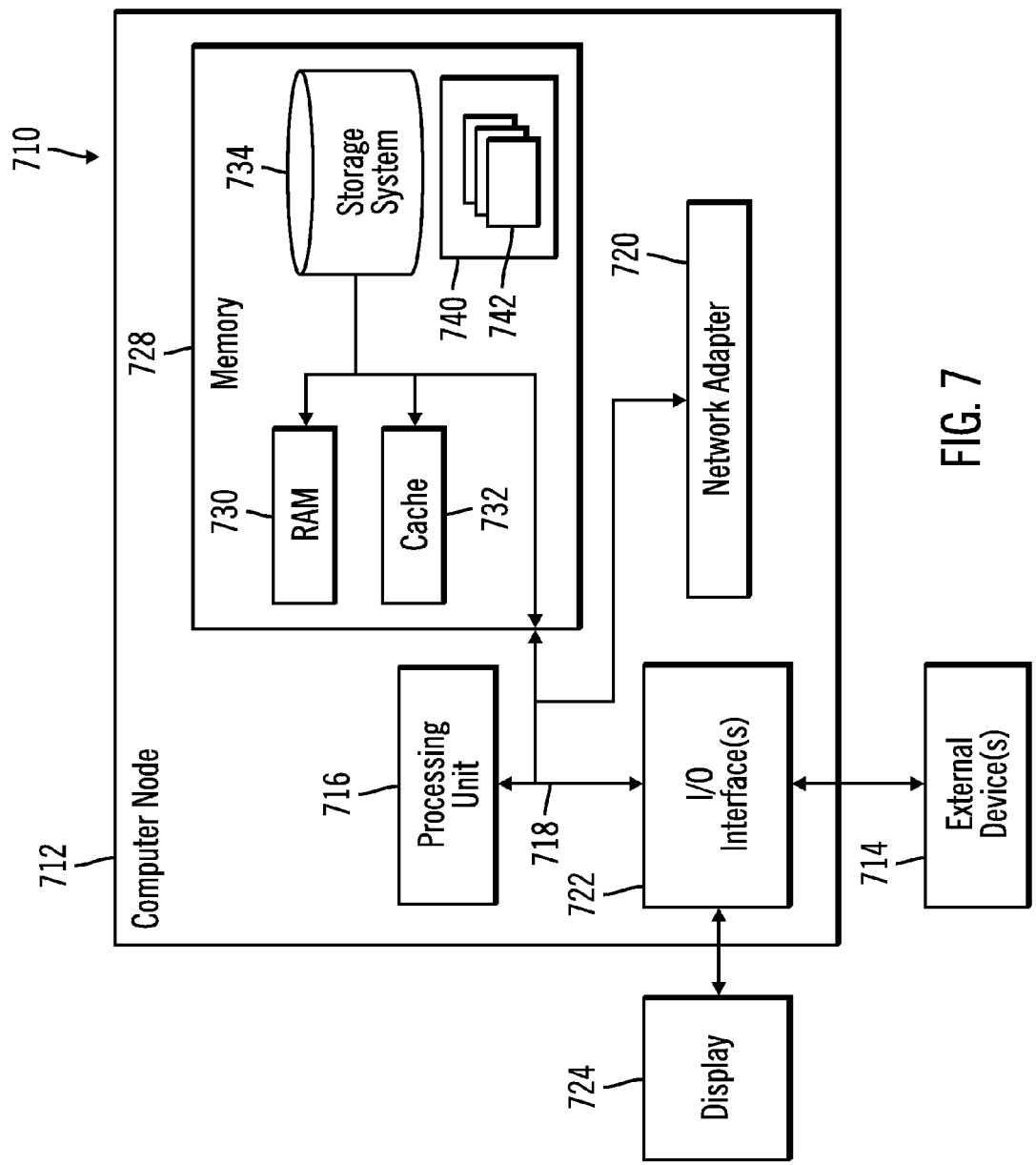
FIG. 7 illustrates a cloud computing node in accordance with certain embodiments.

Referring now to FIG. 7, a schematic of an example of a cloud computing node is shown. Cloud computing node 710 is only one example of a suitable cloud computing node and is not intended to suggest any limitation as to the scope of use or functionality of embodiments of the invention described herein. Regardless, cloud computing node 710 is capable of being implemented and/or performing any of the functionality set forth hereinabove.

In cloud computing node 710 there is a computer system/server 712, which is operational with numerous other general purpose or special purpose computing system environments or configurations. Examples of well-known computing systems, environments, and/or configurations that may be suitable for use with computer system/server 712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 712 may be described in the general context of computer system executable instructions, such as program modules, being executed by a computer system. Generally, program modules may include routines, programs, objects, components, logic, data structures, and so on that perform particular tasks or implement particular abstract data types. Computer system/server 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 712 in cloud computing node 710 is shown in the form of a general-purpose computing device. The components of computer system/server 712 may include, but are not limited to, one or more processors or processing units 716, a system memory 728, and a bus 718 that couples various system components including system memory 728 to a processor or processing unit 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 712 typically includes a variety of computer system readable media. Such media may be any available media that is accessible by computer system/server 712, and it includes both volatile and non-volatile media, removable and non-removable media.

System memory 728 can include computer system readable media in the form of volatile memory, such as random access memory (RAM) 730 and/or cache memory 732. Computer system/server 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 may include at least one program product having a set (e.g., at least one) of program modules that are configured to carry out the functions of embodiments of the invention.

Program/utility 740, having a set (at least one) of program modules 742, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer system/server 712 may also communicate with one or more external devices 714 such as a keyboard, a pointing device, a display 724, etc.; one or more devices that enable a user to interact with computer system/server 712; and/or any devices (e.g., network card, modem, etc.) that enable computer system/server 712 to communicate with one or more other computing devices. Such communication can occur via Input/Output (I/O) interfaces 722. Still yet, computer system/server 712 can communicate with one or more networks such as a local area network (LAN), a general wide area network (WAN), and/or a public network (e.g., the Internet) via network adapter 720. As depicted, network adapter 720 communicates with the other components of computer system/server 712 via bus 718. It should be understood that although not shown, other hardware and/or software components could be used in conjunction with computer system/server 712. Examples, include, but are not limited to: microcode, device drivers, redundant processing units, external disk drive arrays, RAID systems, tape drives, and data archival storage systems, etc.

Figure 8:
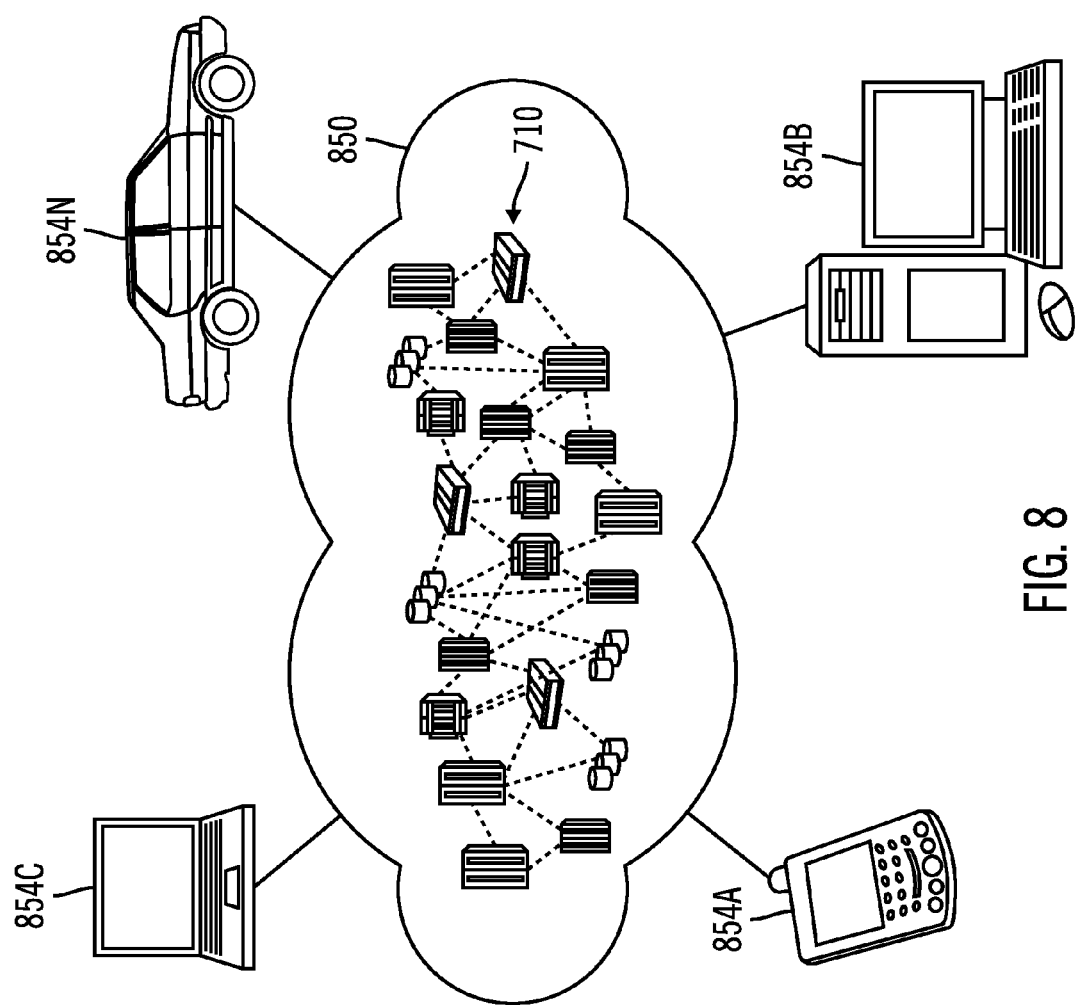
FIG. 8 illustrates a cloud computing environment in accordance with certain embodiments.

Referring now to FIG. 8, illustrative cloud computing environment 850 is depicted. As shown, cloud computing environment 850 comprises one or more cloud computing nodes 710 with which local computing devices used by cloud consumers, such as, for example, personal digital assistant (PDA) or cellular telephone 854A, desktop computer 854B, laptop computer 854C, and/or automobile computer system 854N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 710 and cloud computing environment 850 can communicate with any type of computerized device over any type of network and/or network addressable connection (e.g., using a web browser).

Figure 9:
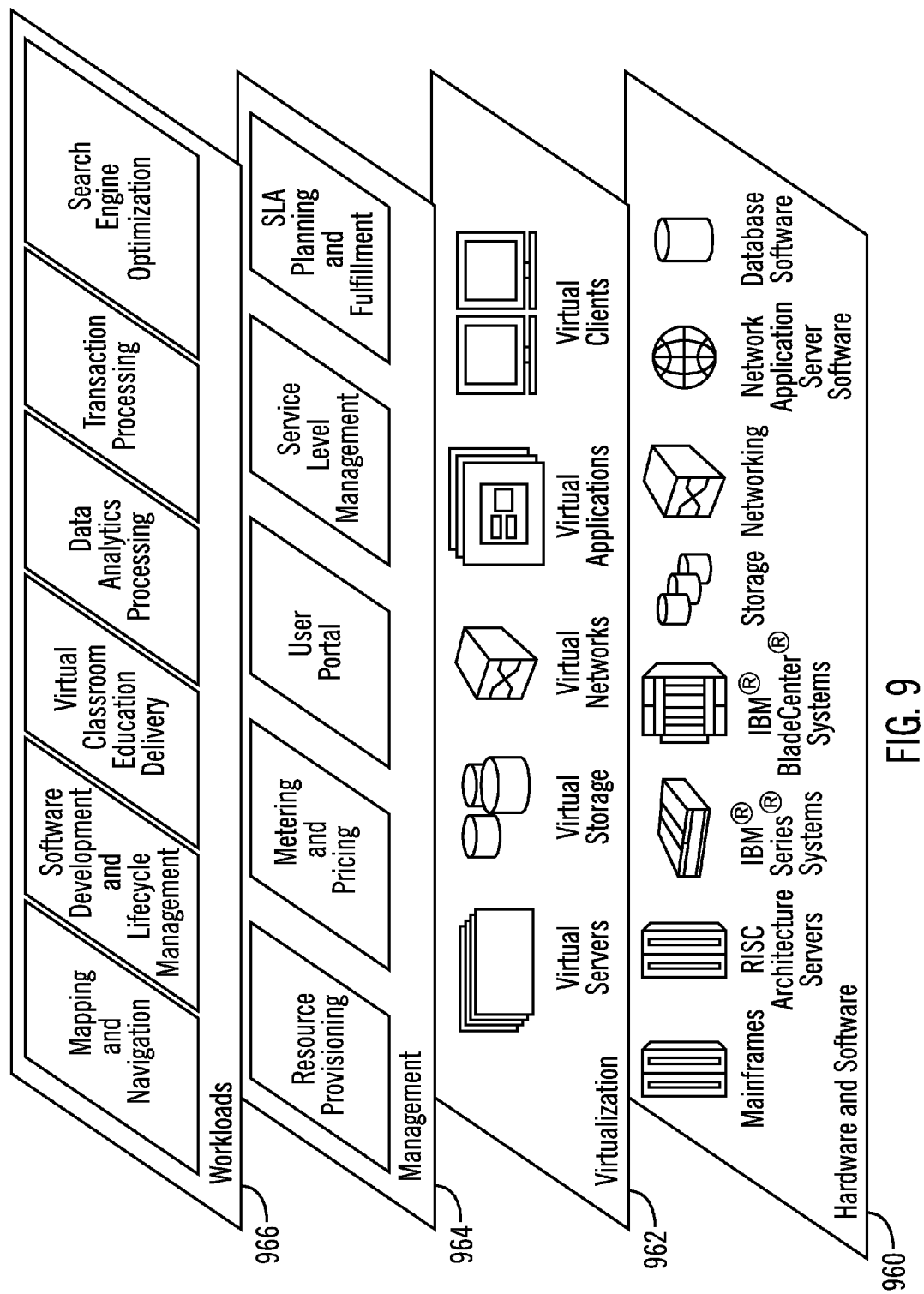
FIG. 9 illustrates abstraction model layers in accordance with certain embodiments.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 962 provides an abstraction layer from which the following examples of virtual entities may be provided: virtual servers; virtual storage; virtual networks, including virtual private networks; virtual applications and operating systems; and virtual clients.

In one example, management layer 964 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 966 provides examples of functionality for which the cloud computing environment may be utilized. Examples of workloads and functions which may be provided from this layer include: mapping and navigation; software development and lifecycle management; virtual classroom education delivery; data analytics processing; transaction processing; and search engine optimization.

Thus, in certain embodiments, software or a program, implementing search engine optimization in accordance with embodiments described herein, is provided as a service in a cloud environment.

In certain embodiments, the client computer 100 and/or the server computer 150 have the architecture of computing node 710. In certain embodiments, the client computer 100 and the server computer 150 are part of a cloud environment. In certain alternative embodiments, the client computer 100 and/or the server computer 150 are not part of a cloud environment.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list)

of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the flow diagrams show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A computer program product for ranking search results, the computer program product comprising:
   a non-transitory computer readable storage medium having computer readable program code embodied therewith, the computer readable program code, executable by at least one processor of a computer to perform a method comprising:
   in response to receiving a search request with a search keyword to locate a list of pages, providing the list of pages;
   determining that a find operation with a find keyword has been issued for a page in the list of pages to locate the find keyword on the page;
   in response to determining that the find keyword has been located on the page, storing the find keyword in an index as relevant text for the page; and
   in response to receiving a subsequent search request for which the page is retrieved, ranking the page based on the find keyword.

2. The computer program product of claim 1, the computer readable program code, executable by the at least one processor of the computer to perform a method comprising:
   marking the find keyword as high priority in the index.

3. The computer program product of claim 2, wherein the page is ranked higher in a list of pages when the find keyword is marked as high priority in the index.

4. The computer program product of claim 1, the computer readable program code, executable by the at least one processor of the computer to perform a method comprising:
   in response to determining that the find keyword has not been located on the page,
   storing the find keyword in the index for the page; and
   marking the find keyword as low priority in the index.

5. The computer program product of claim 4, wherein the page is ranked lower in a list of pages when the find keyword is marked as low priority in the index.

6. The computer program product of claim 1, the computer readable program code, executable by the at least one processor of the computer to perform a method comprising:
   receiving a find keyword filter that identifies a subset of find keywords that are to be stored in the index.

7. The computer program product of claim 1, the computer readable program code, executable by the at least one processor of the computer to perform a method comprising:
   receiving a ranking filter that specifies a subset of find keywords in the index that are to be used to rank the page.

8. The computer program product of claim 1, wherein a Software as a Service (SaaS) is configured to perform the computer program product operations.

9. A computer system for ranking search results, comprising:
   at least one processor; and
   a storage device coupled to the at least one processor, wherein the storage device has stored thereon a program, and wherein the processor is configured to execute instructions of the program to perform operations, wherein the operations comprise:
   in response to receiving a search request with a search keyword to locate a list of pages, providing the list of pages;
   determining that a find operation with a find keyword has been issued for a page in the list of pages to locate the find keyword on the page;

in response to determining that the find keyword has been located on the page, storing the find keyword in an index as relevant text for the page; and in response to receiving a subsequent search request for which the page is retrieved, ranking the page based on the find keyword.

10. The computer system of claim 9, wherein the operations further comprise:

marking the find keyword as high priority in the index.

11. The computer system of claim 10, wherein the page is ranked higher in a list of pages when the find keyword is marked as high priority in the index.

12. The computer system of claim 9, wherein the operations further comprise:

in response to determining that the find keyword has not been located on the page,
storing the find keyword in the index for the page; and
marking the find keyword as low priority in the index.

13. The computer system of claim 12, wherein the page is ranked lower in a list of pages when the find keyword is marked as low priority in the index.

14. The computer system of claim 9, wherein the operations further comprise:

receiving a find keyword filter that identifies a subset of find keywords that are to be stored in the index.

15. The computer system of claim 9, wherein the operations further comprise:

receiving a ranking filter that specifies a subset of find keywords in the index that are to be used to rank the page.

16. The computer system of claim 9, wherein a Software as a Service (SaaS) is provided to perform the system operations.

17. A computer system for ranking search results, comprising:

at least one processor; and
hardware logic coupled to the processor, wherein the hardware logic performs operations that comprise:
in response to receiving a search request with a search keyword to locate a list of pages, providing the list of pages;
determining that a find operation with a find keyword has been issued for a page in the list of pages to locate the find keyword on the page;
in response to determining that the find keyword has been located on the page, storing the find keyword in an index as relevant text for the page; and
in response to receiving a subsequent search request for which the page is retrieved, ranking the page based on the find keyword.

\* \* \* \* \*